I. N. GATES.
MOLD AND CORE FOR CONSTRUCTING BUILDING WALLS.
APPLICATION FILED JAN. 24, 1910.
1,116,352.
Patented Nov. 3, 1914.
3 SHEETS—SHEET 2.
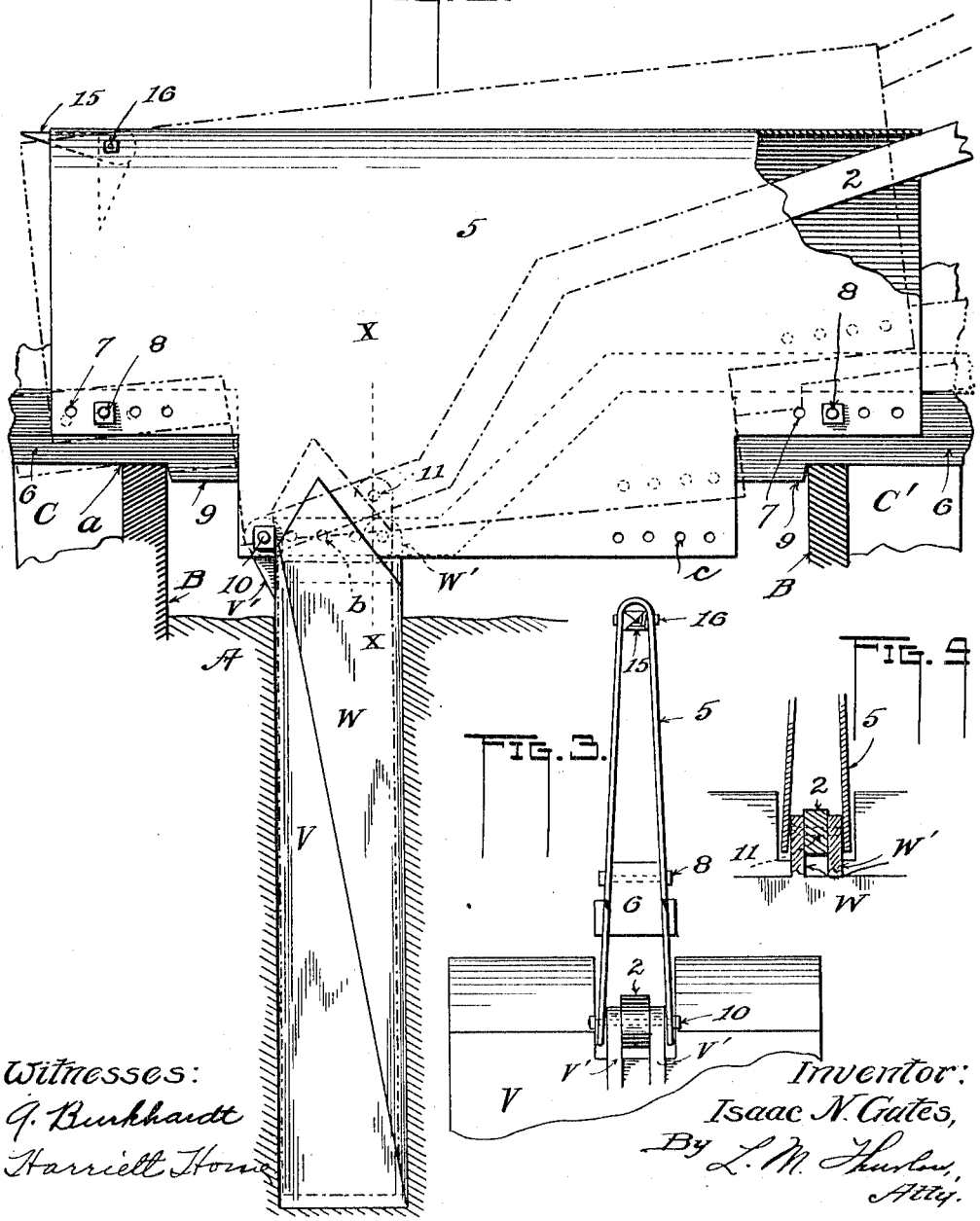

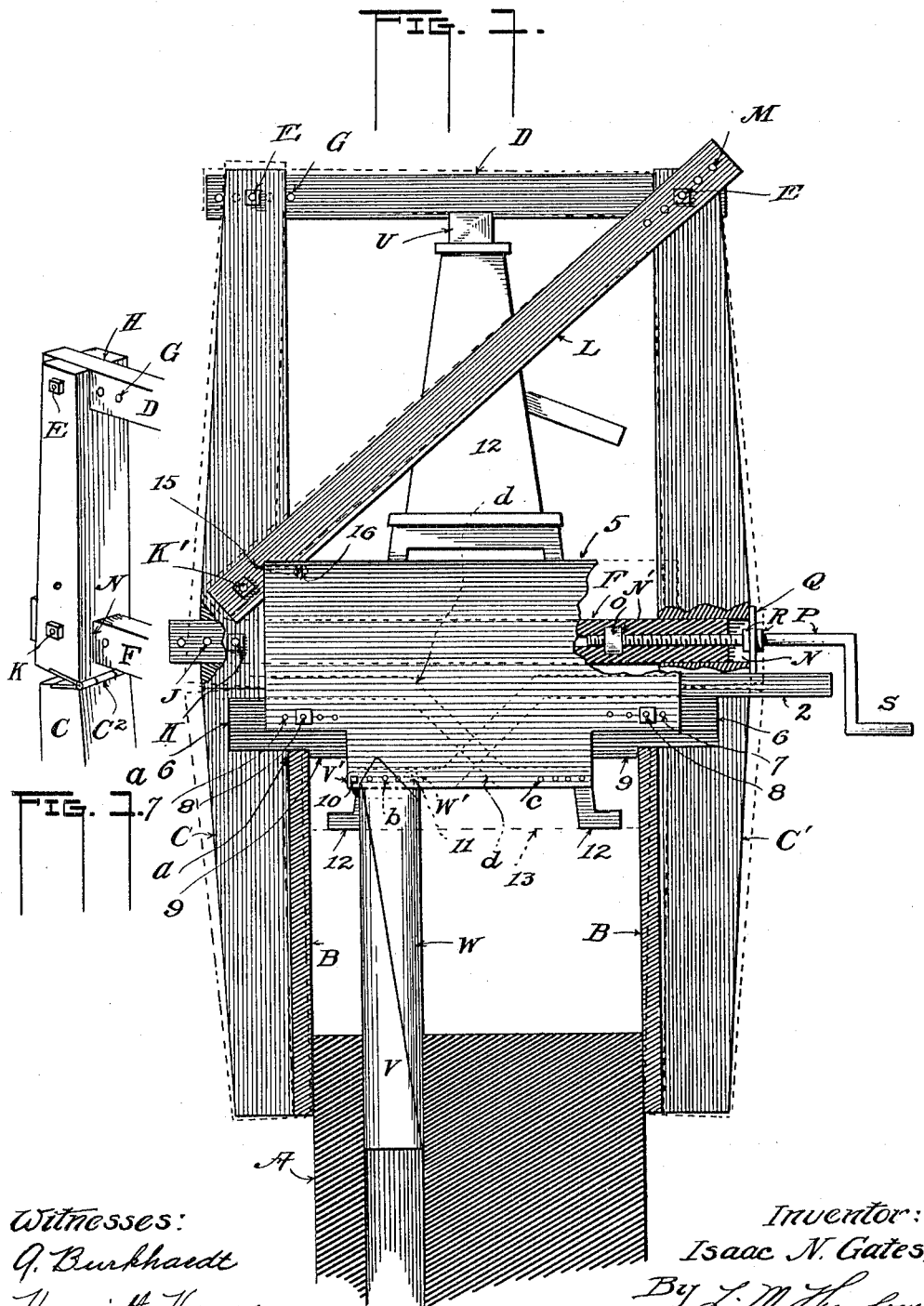

I. N. GATES.
MOLD AND CORE FOR CONSTRUCTING BUILDING WALLS.
APPLICATION FILED JAN. 24, 1910.
1,116,352.
Patented Nov. 3, 1914.
3 SHEETS—SHEET 3.
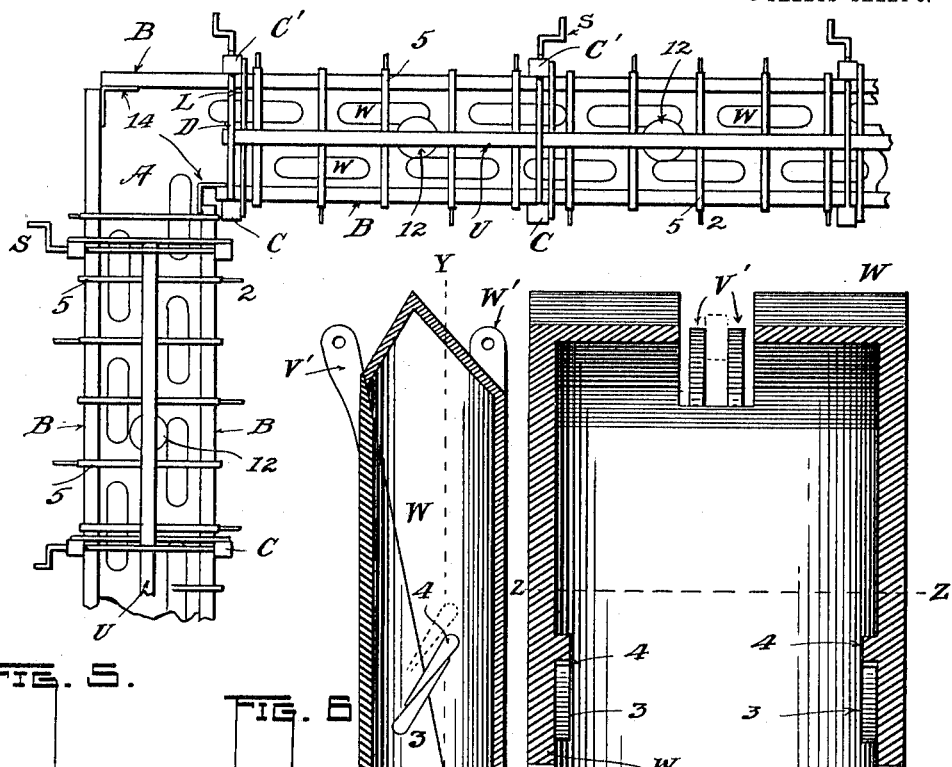
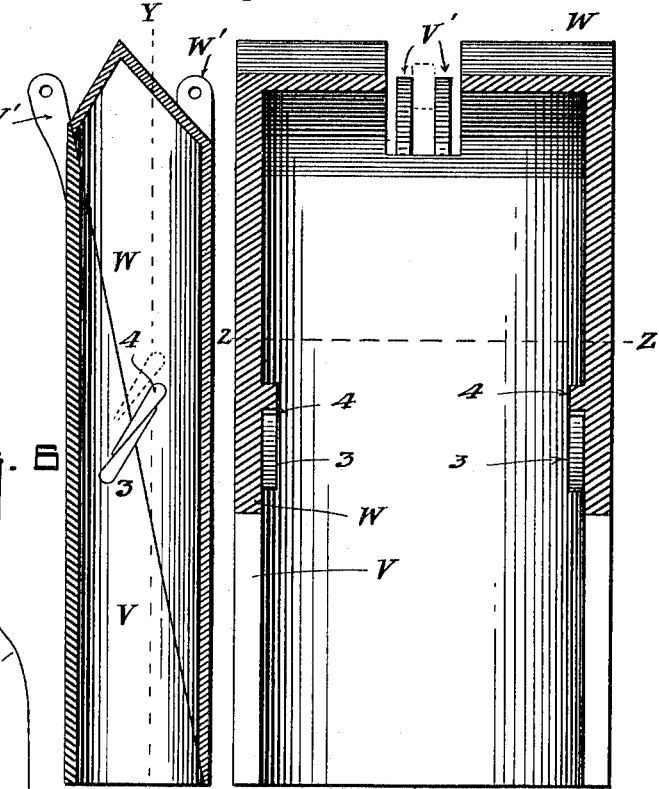
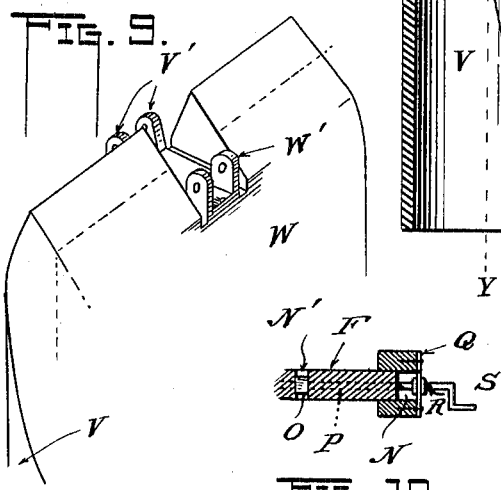
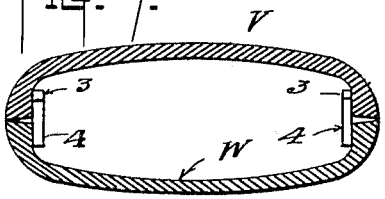
Witnesses:
A. Burkhardt
Harriett Howe
Inventor:
Isaac N. Gates,
By L. M. Thurlow,
Atty.

UNITED STATES PATENT OFFICE.

ISAAC N. GATES, OF PEORIA, ILLINOIS, ASSIGNOR OF ONE-HALF TO DANIEL R. SHEEN, OF PEORIA, ILLINOIS.

MOLD AND CORE FOR CONSTRUCTING BUILDING-WALLS.

1,116,352.  Specification of Letters Patent. Patented Nov. 3, 1914.

Application filed January 24, 1910. Serial No. 539,858.

*To all whom it may concern:*

Be it known that I, ISAAC N. GATES, citizen of the United States, residing at Peoria, in the county of Peoria and State of Illinois, have invented certain new and useful Improvements in Molds and Cores for Constructing Building-Walls; and I do hereby declare that the following is a full, clear, and exact description of the invention, which will enable others skilled in the art to which it appertains to make and use the same.

This invention relates to an apparatus for and as an aid in constructing concrete structures such as the walls of buildings and the like, and to a new type of core for use in conjunction therewith for creating cavities or air spaces in such structures.

The invention also relates to combining mold boards with a clamp and to a two-part core and a supporting means therefor by which said parts are moved relatively all being mounted on the apparatus and all of which act together to produce a certain definite result.

An object of the invention is to provide a new form of clamping arrangement on which the mold boards are carried.

A further object is to provide a series of clamping members for mold boards of considerable length and connect said members in series so that all of them and the said mold boards and the cores carried thereby can be raised simultaneously as a unit so that the structure being built may be produced at the least expense of time and labor.

Another object is to provide a clamp whose adjustability will admit of constructing a wall of any desired thickness.

A further object is to provide a core of two portions slidable relatively whereby the said core can be released from the cavity or opening created by it and to provide a new and peculiar supporting and core operating device adapted to rest upon the mold boards or other part of the mechanism to be lifted therewith as the said mold boards are elevated.

Other objects and advantages will appear in the following specification aided by the accompanying drawings in which:—

Figure 1 is a transverse sectional elevation of a wall showing the mold boards in section, a clamp to which the latter are secured and a core and means for supporting it. Fig. 1ª shows in perspective certain members shown in Fig. 1. Fig. 2 is an elevation of the core and the means that supports it showing the latter resting upon the mold boards, all being shown on a much larger scale than in Fig. 1. Fig. 3 is an end elevation of one of the parts shown in Fig. 2, the core being shown in connection therewith. Fig. 4 is a vertical section of the same parts on line X X Fig. 2. Fig. 5 is a plan of a building wall showing the manner of distributing the clamping members and cores. Fig. 6 is a vertical section of the core through its minor axis. Fig. 7 is a vertical section of the same through substantially its major axis on line Y Y Fig. 6. Fig. 8 is a horizontal section of the core on line Z Z Fig. 7. Fig. 9 shows in perspective the upper portion or top of the core. Fig. 10 is a horizontal section of certain adjusting members shown in Fig. 1.

There are many devices used in building concrete walls but it is the purpose of this invention to provide a more simple and convenient form of device having several advantages that those mentioned do not possess.

I first make use of a new form of clamp for the mold boards usually employed by providing adjustable members therefor to vary the width of the walls and provide for it means by which it will always be set at a desired gage. I also provide a new form of core consisting of two portions which are shiftable longitudinally upon one another to provide for easily releasing said core from the wall and furnish for it a peculiar form of support by which the portions can be readily shifted or held in their working position and all of which will be brought out herein.

In Fig. 1, a wall under construction is designated by the reference letter A and the mold boards between which the wall is built are illustrated by B; these boards being of any convenient or desired length. A series of clamps are used in conjunction with and for holding the boards, each said clamp consisting of two substantially vertical bars C and C' to the lower ends of which the said boards are secured in any good manner. The upper ends of said bars are connected for instance by a cross bar D, bolts E or like means being used for that purpose, while at substantially the middle of their lengths said bars C C' are connected by a cross bar F. The said bar D is provided with a series of holes G at one end and one of the bolts E extends through the bar C and any one of the holes G whereby any degree of separation of said members C C' may be had. The manner in which the several bars C, C' and D may be associated at the top is shown in Fig. 1ª in which the bar C is provided with a notch H to receive the bar D and through which the latter can be shifted. The middle bar F is let through the bar C, Fig. 1, and a series of holes J in said bar F admits of any adjustment and as in the other instances, there is a bolt K which extends through both bars to secure them relatively. A diagonal bracing bar L is secured at its lower end to the bar C by a bolt K' and its upper end is provided with a series of holes M one of the bolts E extending through one of these holes and through the bars C' and D. The bar L serves as a brace for the parts C and D by forming a rigid triangle therewith and the holes M in said bar D admit of any change of distance between the two vertical bars C C' as will be understood. The bar F at its end opposite the one having the holes J is let into the adjacent bar C' through a slot N after the manner shown in Fig. 10. Extending transversely through this bar is a slot N' in which is placed a nut O with which engages a thread-bar P extending into the end of the said bar F to meet said nut. The thread-bar also extends through a plate Q secured upon the outer surface of the upright bar C' and has a fixed collar R at each side of said plate so that a movement of the thread-bar will serve to shift the position of the bar F and said bar is provided with a crank-arm S as shown in Figs. 1, 5 and 10. The bar F does not extend entirely through the bar C' but there is a space between it and the plate Q to permit movement of the two bars relatively so that the two bars C and C' may have a wide range of movement. Since the bar C and the bar D at the top are braced and held relatively rigid through the diagonal bar L as explained, the movement of the bar C' due to said thread-bar will be a pivotal one on its bolt E at the top; this movement being entirely independent of the said bars D and L.

At U is a bar extending parallel to the mold boards B and upon which the series of clamping devices is hung, the bars D being preferably notched to receive and hold it. This member is employed to lift the entire series of clamps and the parts suspended therefrom as will be hereinafter described.

I have illustrated my improved form of core for creating air spaces in the wall, also the peculiar means from which it is suspended and by which its two parts are moved relatively. The core as already intimated consists of two portions indicated by V and W both of which are triangular in form as viewed in Figs. 1, 2 and 6 in that both have inclined faces, slidable upon one another, the portion V being pointed at its upper end and broad at its bottom while the portion W is the reverse i. e. pointed at its lower end and broad at the top. The member W, as shown particularly in Figs. 6, 7 and 9 has two ears W' at its upper end by which it is suspended from a lever 2 to be described; the portion V also having a pair of ears V' by which it is suspended from a housing also to be described. Preferably the core is substantially oval in horizontal section and is hollow or in the form of a shell. It is open at the bottom in order to allow any dirt or cement to fall out that may chance to enter and the top is preferably of a closed form having a pointed end to aid in carrying away any cement falling upon it. The edges of the mold where they slide upon one another are made to fit closely so as to exclude the cement as much as possible and each is provided interiorly upon its opposite walls, as shown in Fig. 6, with diagonally placed lugs those of the member V being indicated by 3 and which point diagonally upward; and those of the member W being indicated at 4 and pointing diagonally downward. It is to be observed that these lugs extend across the dividing line of the two core portions and are so disposed that when said portions are moved relatively in a longitudinal direction to bring the two pairs of lugs into engagement with each other the incline of each will operate to carry the two portions into firm and close engagement so that after the portions have shifted longitudinally as described, as results when removing the core from the wall, the portion W, which in the removal is raised from the portion V, on being returned to its normal position is firmly drawn against the portion V by its lugs 4 meeting the lugs 3 and the weight of the said portion W will cause this as would also the act of forcing the portions to their normal relative positions and the lugs are of such length that within the limits of movement of the core portions said lugs will prevent such portions from being separated laterally.

Extending across the mold boards B is a support 5 preferably of thin metal bent into the form of an A which I term a housing or hood between the extremities of which at each end is a member 6 whose form as viewed endwise is indicated in Fig. 3 although, of course, its exact form is not important. A series of holes 7 is provided in the two extremities which receive these members by which the distance between said members may be varied; there being bolts 8 provided for securing them in place. Said blocks have shoulders at 9, Figs. 1 and 2, which serve to hold the housing relative to the mold board so as to properly locate the core between said boards, although any other means may be used for this purpose. The lever 2 hereinbefore mentioned is pivoted between the lower edges of the housing by means of a bolt 10 which extends through said housing, the ears V' of the mold-section V, and said lever; this bolt serving as a pivot for these parts while a pin 11 serves to suspend the section W from the said lever by passing through said lever and the ears W' of said section but as clearly shown in Fig. 4 this pin does not extend through the extremities of the housing.

When in position for work the core and the housing occupy the position shown in full lines in Fig. 1 and after the cement is filled into the mold and left a sufficient length of time to properly set so that the core can be removed, the lever 2 is raised as shown in full lines in Fig. 2; the bolt 10 serving as the fulcrum for the same. This movement lifts the core section W, which, in moving upward moves upon the incline of the section V. The result of this movement is that the core is reduced in thickness as indicated by the broken lines in said Fig. 2, the travel of the section W upon the section V being possible by reason of the fact that the bolt 11 by which said portion W is raised naturally describes an arc of movement about the bolt 10 and that the chord of that arc lies parallel to or substantially parallel to said incline. As both sections of the core are wedges one of which is inverted, a movement of one of them as in the present case will either reduce or increase the thickness of the core of which both sections are parts. In the upward movement the lever having raised the section W now reaches the top of the housing and lifts it so as to tilt it on the corner of one of the mold boards at the point $a$, said corner serving as the fulcrum for the housing. The latter is now the lever having taken the place of the lever 2 the fulcrum having thus been transferred from the bolt 10 to the said point $a$. This movement results in raising the core portion W, still higher but this time the core portion V is also lifted and drawn away from the concrete at its side having the perpendicular face after which the entire device can be removed if desired. In the first lifting movement the core portion W is torn away from the cement if there is a tendency to adhere, and the succeeding movement i. e. the raising movement of the housing 5 results in tearing the portion V away from the cement as just explained. The first movement then lifts the portion W to make room for the portion V so that it also can be raised. The entire core having been loosened in this manner the lever is let back into place and the housing permitted to rest upon the mold boards. The last named members are then loosened by turning the crank in the proper direction which results in moving the bars C and C' apart and the consequent separation of the mold boards by tilting them away from the surface of the wall and in order to aid in this operation I have preferably divided each bar C and C' into two portions as shown and these are hingedly connected near the bar F by means of hinges one of which is shown at $C^2$ in Fig. 1$^a$ so that as said bars separate they will first move outward at their middles substantially as indicated by the broken lines in Fig. 1, the mold boards thus moving outward or away from each other at their upper edges and thereby torn away from the wall; this being of particular advantage if they have any tendency to adhere to the wall. However, before the series of clamps are thus loosened a lifting device such, for instance, as a jack indicated at 12 in Fig. 1 and in several places as in Fig. 5 is placed beneath the longitudinal bar U by means of which said bar and all of the clamps and all of the cores are lifted bodily at one movement. To make this clear it is to be understood that for instance as shown in Fig. 1 the horizontal broken line denoted by the numeral 13 represents the level of the concrete as it has been filled in upon the wall A. When the concrete has set a sufficient length of time to retain its shape and support a weight the jacks are placed upon it and the entire apparatus raised.

It is to be noted that the blocks 6 which rest upon the mold boards act as gages to properly space the latter and at the same time permit them to swing outward. Any thickness of wall may be made by adjusting the bolts E and the bolt K to the desired holes and the blocks 6 just mentioned may be adjusted to admit of the desired separation of the mold boards for a thicker wall. It is to be observed that in the use of the members 6 or some other equivalent means the mold boards are always properly gaged apart, that is to say, when the clamping screw P is tightened the boards will meet said members and the resulting wall will be of the same thickness from bottom to top and the adjustment of the members through their bolts 8 allow for any desired change in thickness of wall. But any other method may be used to obtain the desired result as, for instance, the bar F in meeting the collar R would have the same effect. The bolt 10 which is the fulcrum for the lever 2 may be adjusted to any one of a horizontal line of holes $b$ in the extremities of the housing so that if desired the core can be moved nearer the middle of the wall. Also, I have provided a series of corresponding holes $c$ at the other end of the housing so that a second lever 2 may be used at the opposite end of the housing, see broken lines $d$ $d$ Fig. 1, for supporting a second core, not shown, and thereby two cores can be suspended from a single housing. If two cores are thus used the levers can be raised simultaneously and the housing tipped first on one mold board as described and then on the other thereby freeing both cores very readily substantially in the same way as described hereinbefore.

I have indicated in Fig. 5 a series of cores, " staggered " or placed in a zig-zag position each being suspended from its own housing. It is understood of course that any number of cores, may be utilized to provide the desired number of air spaces and in this figure also the manner of forming the corner or angle of a wall is shown. The mold where the mold boards approach one another at their ends has two strips of metal 14 having their limbs bent at right angles and each of a length to extend across the full height of the said mold boards to close the opening and for preventing the concrete from working through. The metal of which these are formed can be very thin so that the imprint left thereby in the concrete will be hardly distinguishable in the completed wall and will not constitute a disfigurement.

After a section of concrete has been filled in and allowed to set the entire mechanism including the cores may be raised by the jacks to the proper height or until but a few inches of the mold boards remain in contact with the wall as shown in Fig. 1; this being also true of the cores which hang suspended a few inches within the openings left by them. Then the thread bar on being operated clamps the mold board in place and in being thus held rigidly in position the concrete can again be filled in, the operation being repeated until the wall is of the desired height. In Figs. 1, 2 and 3 a pointed member 15 is shown pivoted in the top of the housing 5 by means, for instance, of a bolt 16. This member normally hangs downward out of the way but when raised to a horizontal position the point extends beyond or a short distance outside the housing. In building a foundation close to the wall of an excavation where but one board is desirable and therefore having but one board on which the housing can rest I provide this said member 15 which can be forced into the dirt wall, or, if the earth is too soft to hold the weight of the housing and core, any unyielding object as a piece of wood, not shown, may be interposed between the dirt and the member to receive the latter. This interposed object will sink into the dirt and hold the weight while the housing is lifted as before, the member 15 serving as the fulcrum instead of the mold board B the work proceeding as before.

The bars C and C' of the clamp may, of course, be single members i. e. rigid throughout but my preference is to hinge them in some such way as described in order to cause the mold boards to leave the wall in the manner mentioned. The housing 5 has been described as lying across and upon the mold boards but it may be suspended from any other part of the mechanism so long as the same action and results can be obtained all of which may be understood as coming within the meaning of my invention; this also extending to other changes in the balance of the mechanism as would be considered equivalents of the structure shown and described.

The construction of my clamp is novel in that while the uprights C C' are adjustable at their upper ends laterally with respect to one another, the diagonal brace L, or equivalent means, serves to prevent movement of said uprights in a longitudinal direction with respect to one another. In addition, also, the middle member F besides providing for a rough adjustment of the uprights with respect to one another includes a thread-bar or its equivalent, by which a fine adjustment may be had which is a combination that is not found in the art as a combination. Again the said uprights are divided into two portions for the more ready removal of the mold boards from the concrete as has been described and the structure is such that the portions of said uprights in being hinged at their inner sides or on the surfaces facing one another and the line of separation of the portions being perpendicular to the said surfaces, the adjustment of the thread-bar will allow the portions to pivot relatively in but one direction the meeting of the parts at the said line of separation preventing movement in the other direction after pressure is placed upon the wall A through the mold boards, it being understood that the member F has sufficient play in the uprights to permit free movement of those parts for obtaining the various adjustments.

Having thus described my invention, I claim:—

1. In combination, a pair of substantially straight parallel uprights constituting a clamp for a mold, a cross member connecting them, and adjustable on one of them and adapted for changing the distance between said uprights, a diagonally disposed brace attached to both said uprights and adjustable on one of them, a cross bar extending between the uprights and adjustable on one of them, a member fixed to the said cross bar, a member fixed to one of the uprights, and a thread bar engaging the member of the cross bar and rotatable in the member of the upright and limited by it in its longitudinal movement, the clamping uprights composed each of two sections lying end to end and means hingedly connected at their abutting ends on their clamping surfaces.

2. The combination of a pair of uprights, to constitute a mold, means connecting them at their upper ends and providing for the pivotal movement of one of them relative to the other, means to adjust said members laterally with respect to one another, one of said uprights consisting of two hingedly connected portions one depending from the other, and a mold board for each said upright, one of them being carried by the said depending portion.

3. The combination of a pair of uprights to constitute a mold, means connecting them at their upper ends and providing for the pivotal movement of one of them relative to the other, means to adjust said members laterally with respect to one another, each said upright having a depending extension hingedly attached thereto, the uprights and their extensions being hinged at the surfaces thereof facing one another.

4. The combination of a pair of uprights, means connecting them at their upper ends, said uprights adapted to pivot relatively at their said upper ends, means to adjust said uprights laterally with respect to one another, and a member hinged to the lower end of one of said uprights and capable of swinging toward the opposite upright.

5. The combination of a pair of uprights, means connecting them at their upper ends, said upright adapted to pivot relatively at their said upper ends, means to adjust said uprights laterally with respect to one another, and a member hinged to the lower end of one of said uprights and capable of swinging toward the opposite upright, and means to prevent said member swinging in the opposite direction.

6. The combination with a pair of mold boards of a pair of uprights, to carry them and constituting a clamp, one of said uprights adapted to have pivotal movement at its upper end relative to the other, one of said uprights consisting of two parts hingedly connected at the surface facing the opposite upright, means to normally maintain the facing surfaces of the parts in a straight line, and means to adapt said uprights.

7. In a device for use in building concrete structures, the combination of a member supported above the structure being built, a lever pivoted to said member, a core-portion pivotally suspended from said member at said pivot, and a core-portion pivotally suspended from the lever and associated with the first said core-portion.

8. The combination of a pair of mold boards, a member supported above and upon said boards, a lever pivoted to said member, a core portion pivotally suspended from the member substantially at the point of pivotal support of said lever, and having a sloping surface and a core portion pivotally suspended from the lever adjacent the first said portion and also having a sloping surface adapted to bear upon that of the first and slidable thereon.

9. The combination of a supporting member above a concrete structure being formed, a lever pivoted thereto, and a core freely suspended therefrom having straight vertical sides and divided into two portions, the line of separation extending diagonally downward and terminating at opposite sides of said core, one having a small upper end and the other a large upper end, the former being suspended substantially at the pivot of said lever, the latter being suspended from said lever at a point distant from the said pivot.

10. The combination of a supporting member above a concrete structure being formed, a lever pivoted thereto, a core freely suspended therefrom having straight vertical sides and divided into two portions, the line of separation extending diagonally downward and terminating at opposite sides of said core, one having a small upper end and the other a large upper end, the former being suspended substantially at the pivot of said lever, the latter being suspended from said lever at a point distant from the said pivot, said lever being adjustable upon the said supporting member.

11. The combination of means in which to form a concrete structure, a core of two associated parts having the line of separation of its parts inclined at an angle to its vertical height, each part thereby having a flat inclined face, a member to which one of said core parts is pivotally suspended, and a second member pivoted to the first said member and having the other core part suspended therefrom, the movement of one of the members relative to the other adapted to shift one of the core parts in a longitudinal direction upon and relative to the other.

12. The combination of an inclosure in which to form a concrete structure, a core of two associated parts whose contacting faces are straight and disposed at an angle to the vertical height of the said core, means to pivotally suspend the two parts, one of said means adapted to move one of the core parts relative to the other.

13. In a mold the combination of a pair of mold boards, means to carry them and maintain them in rigid adjustment, a core supporting member separate from the said means and resting on said boards, a core of two parts pivotally suspended from said member, the latter adapted to tilt upward on one of said boards to raise said core, and means to raise the mold boards and said core supporting member together as a unit.

14. A core supporting member, a second core supporting member pivoted thereon, an inverted wedge-shaped core section pivotally suspended at its upper small end to first said member, and a second wedge-shaped core section associated with and slidable upon the first section and pivoted at its upper large end to said second core supporting member.

15. A core supporting member, a second core supporting member pivoted thereon, a wedge-shaped core section pivotally suspended at its upper small end substantially at the pivot point of the said second core supporting member, a second wedge-shaped core section pivoted at its upper large end to the said second core supporting member and movable vertically relatively to the first said section, the surfaces of both the core sections being inclined to the line of such vertical movement adapted to move upon one another.

16. In a mechanism of the character described, a substantially A-shaped support, a lever pivoted between the extensions of said support, a wedge-shaped core section having a straight vertical outer side pivoted at its small end substantially at the pivot of the lever, and a second wedge-shaped core section pivoted at its large end to said lever and likewise having a straight vertical outer side.

17. In a mold for forming a cement wall and providing it with air spaces comprising a pair of mold boards, a core supporting mechanism consisting of a member supported in a fixed position relative to said boards but adapted also to tilt relative thereto, a core of two sections provided with abutting faces and adapted to shift relative to one another in a longitudinal direction, one of said sections being supported from the said member, a device carried by and pivoted relative to the member and movable relative thereto and also adapted to move therewith and having the other core section suspended therefrom, and means to adjust the core in a lateral direction between the mold boards, the latter and the member adapted to be lifted as a unit.

18. A mold for forming a cement wall and providing it with air spaces comprising a pair of mold boards, a core supporting mechanism consisting of a member supported in a fixed position relative to said boards but adapted also to tilt relative thereto, a core of two sections provided with abutting faces and adapted to shift relative to one another in a longitudinal direction, one of said sections being supported from the said member, a device carried by and pivoted relative to the member and movable relative thereto and also adapted to move therewith and having the other core section suspended therefrom, means to adjust the core in a lateral direction between the mold boards, the latter and the member adapted to be lifted as a unit, and means to lift the same.

19. In mechanism of the character described, the combination with an inclosure wherein to form a concrete structure, of two core sections suspended in the inclosure, and a member supported in a fixed position relative to the inclosure and having one of the core sections pivotally hung therefrom, a device pivoted in said member and adapted to tilt relative thereto, and having the other core section pivoted thereto, said member adapted to tilt and to lift both sections in its tilting movement.

20. In mechanism of the character described the combination with two bodies between which to form a concrete structure, of a two piece core suspended between the bodies, and a member supported in a fixed position relative thereto and having one of the core sections hung therefrom and adapted to be lifted by a tilting movement of the said member, a device pivoted to said member and having the other core section pivotally suspended therefrom and moved initially thereby, the member adapted to lift both core sections after the said initial movement of the last mentioned section.

21. A core comprising two associated sections having abutting surfaces and slidable relatively one upon the other, each section having a member fixed relative thereto and adapted to interlock, the engaging surfaces thereof being inclined at an angle to the line of movement of the sections relatively whereby to draw the sections together when the members are brought into engagement in shifting said sections relative to one another.

22. A core comprising two associated sections one movable relative to the other, the line of separation of the sections lying at an angle to the direction of movement of movable sections, an extension on each member, each extension being inclined at an angle to said line of separation and extending beyond said line and adapted to engage one another whereby to draw the sections together in shifting them relative to one another.

In testimony whereof I affix my signature, in presence of two witnesses.

ISAAC N. GATES.

Witnesses:
L. M. HARLOW.
E. J. ABERSOL.